J. H. REDFIELD.
FIREARM.
APPLICATION FILED JAN. 29, 1912.

1,290,845.

Patented Jan. 7, 1919.
5 SHEETS—SHEET 3.

WITNESSES:
Olga Berley
W. E. Windsor.

INVENTOR.
John H. Redfield,
BY
ATTORNEY.

J. H. REDFIELD.
FIREARM.
APPLICATION FILED JAN. 29, 1912.

1,290,845.

Patented Jan. 7, 1919.
5 SHEETS—SHEET 4.

WITNESSES·
Olga Berley
W. E. Windsor.

INVENTOR.
John H. Redfield,
BY
ATTORNEY.

UNITED STATES PATENT OFFICE.

JOHN H. REDFIELD, OF DENVER, COLORADO.

FIREARM.

1,290,845.   Specification of Letters Patent.   Patented Jan. 7, 1919.

Application filed January 29, 1912.   Serial No. 674,000.

*To all whom it may concern:*

Be it known that I, JOHN H. REDFIELD, a citizen of the United States, residing in the city and county of Denver and State of Colorado, have invented new and useful Improvements in Firearms; and I do declare the following to be a full, clear, and exact description of my invention, such as will enable others skilled in the art to which it appertains to make and use the same, reference being had to the accompanying drawings, and to the figures of reference marked thereon, which form a part of this specification.

My invention relates to improvements in repeating fire-arms and has for its object the provision of a simple, inexpensive and efficient mechanism for operating the fire arm.

Another object of my invention is the provision of a fire-arm which obviates the possibility of injury due to the explosion or bursting of a cartridge.

Another object of my invention is the provision of a fire-arm constructed to prevent gas resulting from the bursting of a cartridge, from flying back in the face of the operator.

Another object of my invention is the provision of a fire-arm whose operating parts are positive in operation.

Another object of my invention is the provision of a fire-arm, quick and positive in operation.

Another object of my invention is the provision of a positive and efficient shell extracting and ejecting mechanism for the fire-arm.

Another object of my invention is the provision of a fire-arm constructed to preserve the neat and attractive appearance of the same.

Another object of my invention is the assembling of the operating parts of a fire-arm in a manner to produce quick, positive and safe action in firing.

With these and other objects in view I will proceed to describe my invention with reference to the accompanying drawings forming a part hereof.

In these drawings:—

Fig. 24 is a detailed perspective view of the end of the barrel illustrating the slide-bar catch.

The same reference characters indicate the same parts in all the views.

Let the numeral 5 designate the stock of a fire-arm and 6 the barrel thereof. The stock 5 is provided with an extension 7, which forms a part of the receiver, while the barrel 6 is provided with a part 8, which forms the other part or portion of the receiver. The extension 7 is provided with a projection 9 having an interiorly threaded perforation 10 therein, while the part 8, of the receiver, is provided with a lug 12, adapted to enter a slot 13 formed in the part 7 of the receiver. The rear portion of the part 7 of the receiver, is provided with a dowel-pin 14, adapted to enter an opening 15 formed in the rear end of the part 8 of the receiver. After the dowel-pin has been inserted in the opening 15, the lug 12, of the part 8 of the receiver may be caused to enter the slot 13 in the part 7 of the receiver. After the stock 5 and barrel 6 have been in this manner connected together, a threaded extremity 11 of a rod 17, may be caused to enter the perforation 10, and engage the lug 12. Consequently, by tightening this rod 17, its threaded extremity will move the part 8 of the receiver rearwardly, causing the latter to tightly engage the shoulder 18, with which the part 7, of the receiver is provided, and the dowel-pin 14 to enter the perforation 15, with which the rear extremity of the part 8 of the receiver is provided. In this manner the stock 5 and barrel 6 of the gun may be firmly and rigidly connected together.

Attention is here called to the fact that the parts 7 and 8 of the receiver are formed of integral pieces of material and by virtue of their connection with each other the possibility of gas, resulting from the explosion or bursting of a shell, is prevented from escaping from the receiver in a rearward direction, and injuring the operator of the fire-arm. In other words, the joint formed by the rear end of the part 8 of the receiver and the shoulder 18 of the part 7, of the receiver, is at right angles to the length of the fire-arm. Consequently, any gas escaping from the receiver, due to the bursting of a cartridge, must escape therefrom through the joint of the two parts of the receiver, laterally to the length of the fire-arm.

Figure 5:
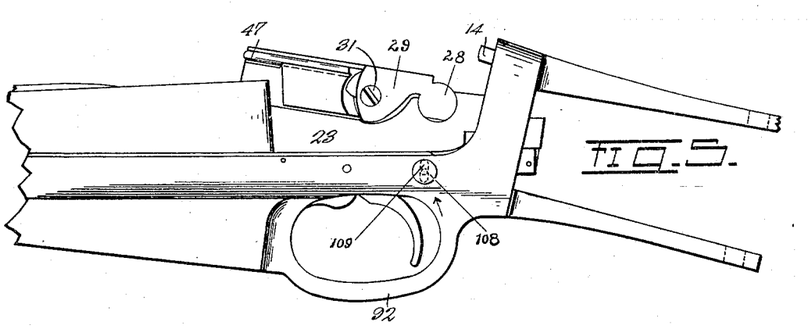
Fig. 5 is a side view of a portion of my improved fire-arm showing the breech-block and the slide-bar for operating the breech-block.

On the interior of the receiver formed by the parts 7 and 8, I arrange a slidably mounted breech-block 21, which is operated by means of a slide-bar 22, having separated arms 23 and 24, which merge into each other at a point 25 and are connected with a handle 26, by means of which the slide-bar 22 is operated, which in turn operates the breech-block 21. The arms 23 and 24 of the slide-bar 22 are respectively provided with sector-shaped sockets 27, which sockets receive wheels 28 of eccentric cam levers 29 and 30, respectively, pivoted upon opposite sides of the breech-block 21, as shown at 31' and 31 respectively. The sockets 27 form sectors of circles while the wheels 28, of the eccentric cam levers 29 and 30, each have a fragment or segment taken away as shown at 32, to permit their insertion into the sector-sockets 27 when the eccentric cam levers 29 and 30 each occupy a position corresponding with the position of the cam levers 29, shown in Fig. 14. After the cam levers 29 and 30 have been moved or turned upon their pivots to cause their wheel-shaped extremities 28 to turn in the sockets 27 until they occupy a position similar to that shown in Fig. 5, it will be impossible to disconnect the cam levers from the arms 23 and 24 of the slide-bar 22. The action of the arms 23 and 24 of the slide-bar 22 upon these cam levers 29 and 30 results in operating the breech-block 21 to cause the latter to move forwardly and rearwardly and at the same time results in operating the mechanism of the breech-block 21 for cocking the same.

Figure 3:
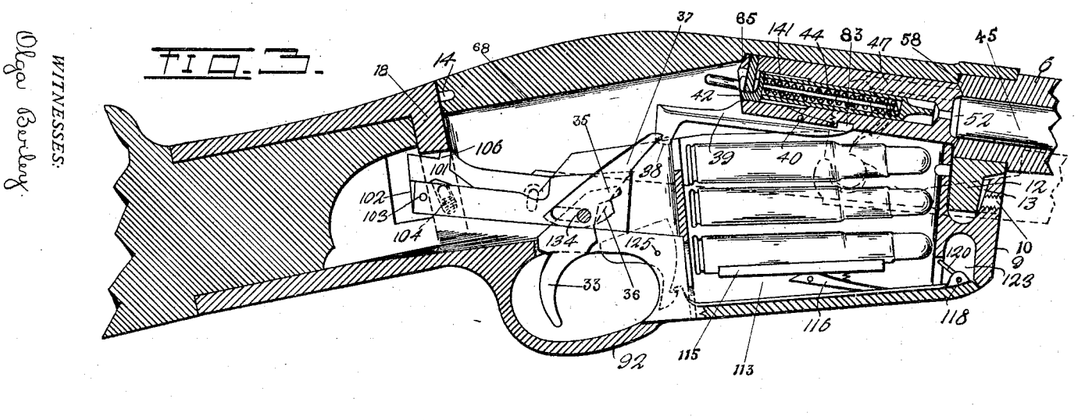
Fig. 3 is a longitudinal section taken on the line 2—2 Fig. 4, looking in the direction of the arrow and showing the operating parts in position ready to fire the fire-arm.

In Fig. 3, the breech-block 21 and its parts are shown in a position set to fire the fire arm. And in this position the operation in firing is as follows:—By pulling rearwardly upon a trigger 33, which is pivoted as shown at 34, an extension 35 is caused to act upon a lug 36 formed upon a member 37 to cause the said member to act upon a lug 38 formed upon a sear 39, pivoted as shown at 40, whereby the said sear 39 is turned upon its pivot 40 to cause a shoulder 41, with which the said sear is provided, to be released from engagement with a shoulder or collar 42, mounted upon the rear extremity of a firing pin 43, whereby the firing pin 43 is released and a spiral spring 44 permitted to act upon the same to move the said firing pin forwardly with sufficient force to explode or burst the primer of a cartridge 45, in the barrel 6, of the fire-arm.

Now since the fire-arm has been fired in the manner above described, the next operation is to extract the shell from the barrel 6 of the fire-arm. This function or operation is accomplished by the rearward movement of the breech-block 21. The slide-bar 22 is moved rearwardly by means of the handle 26, whereby the wheels 28, with which the cam levers 29 and 30 are provided, will be caused to turn in the sockets 27, with which the arms 23 and 24 of the slide-bar 22 are provided, the said cam levers 29 and 30 at the same time, being caused to turn upon their pivots rearwardly, resulting in operating the cam lever 29 to cause its cam surface 46 to act upon a pin 47, mounted in the breech-block 21 for protruding the said pin forwardly into engagement with the barrel 6 of the gun at a point 58, which results in moving the breech-block 21 rearwardly. Of course, the rearward movement of the slide-bar 22 is normally sufficient to move the breech-block rearwardly after the fire-arm has been fired, but since this rearward movement of the breech-block 21, results in extracting the shell, in a manner which will be hereinafter explained, the cam lever 29 acting upon the forward extremity of the receiver chamber through the medium of the pin 47, serves as a lever or leverage for accomplishing the easy extraction of tight shells from the barrel of the fire-arm.

The forward extremity of the breech-block 21 is provided with a cut out portion, 48, in which is pivoted a gripping dog 49 as shown at 50, the said dog having a tooth 51, which is adapted to engage the rim 52 of a cartridge for extracting the latter from the barrel of the fire-arm. This gripping dog 49 is acted upon by means of a spring 53, to cause its tooth 51 to engage the rim 52 of the cartridge. This tooth 51 of the dog 49 engages the rim of the cartridge on one side, while the rim of the cartridge is engaged on the opposite side by an ejector pin 54, normally held in a retracted position by means of a spiral spring 55, which is interposed between the head 56, with which the rear of the pin 54 is provided, and a collar 57, through which the said pin passes. By virtue of the gripping dog 49, the rim 52 of the cartridge will be engaged by the same when the breech-block is in the position shown in Fig. 3 and consequently when the breech-block is moved rearwardly the shell will be extracted from the barrel 7 and carried rearwardly with the breech-block and will be ejected from the receiver in a manner which will later be described. When the slide-bar 22 is operated by means of its handle 26 to carry the breech-block 21 rearwardly, the cam lever 29 is caused to turn upon its pivot in the direction of the arrow, Fig. 14, whereby the cam extremity 46 of the cam lever 29 is caused to act upon the pin 47 to move the latter forwardly into engagement with the barrel of the gun at the point 58 and as a result, the said pin acts upon the barrel to form an additional leverage for assisting the breech-block 21 in its rearward movement to extract the tight or swollen shells from the barrel of the fire-arm as heretofore explained.

Figure 9:
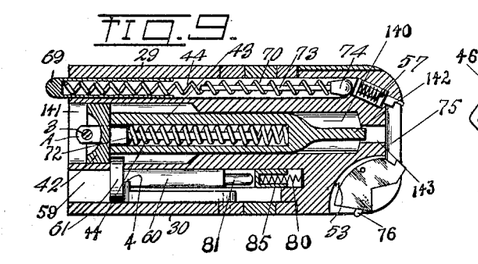
Fig. 9 is a longitudinal section of the breech-block taken on the line 9—9, Fig. 11, looking in the direction of the arrow and showing the mechanism in position to fire.
Figures 10, 11:
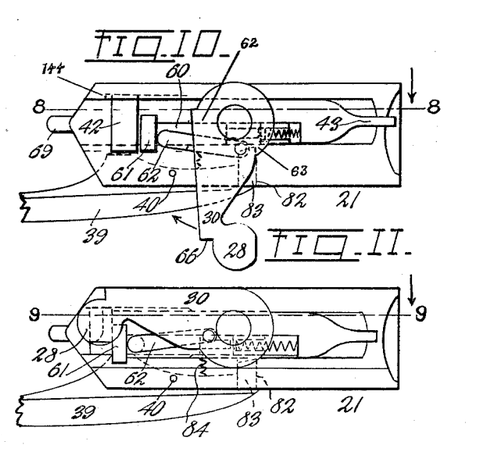
Fig. 10 is a side view of the breech-block, showing the parts in their respective positions after the fire-arm has been fired.
Fig. 11 is a side view of the breech-block showing its parts in the position they occupy when set to fire the fire-arm.
Figure 12:
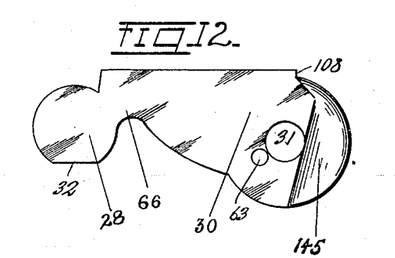
Fig. 12 is a detailed side view of a cam lever employed in connection with the breech-block.
Figure 13:
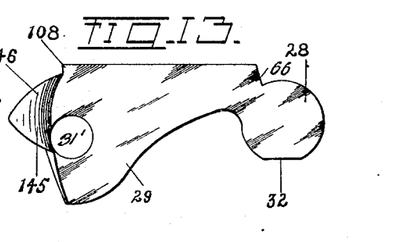
Fig. 13 is a detailed view of another cam lever employed in connection with the breech-block.
Figure 14:
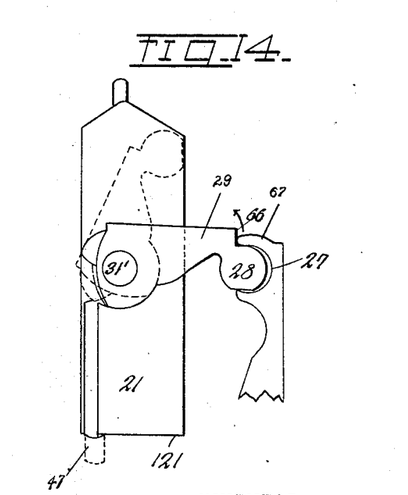
Fig. 14 is a side view of the breech-block, illustrating slide-bar connection with the arms of the cam levers.

During the time that the cam lever is being caused to turn upon its pivot, in the direction of the arrow indicated in Fig. 14, the lever 30 is also caused to turn upon its pivot in the same direction, or in the direction of the arrow indicated in Fig. 10, under the influence of the arm 24 of the slide-bar 22, which arm is connected with the said lever 30 in the manner heretofore described. The turning of the lever 30 upon its pivot in the direction of the arrow indicated in Fig. 10 results in placing the spring 44 under tension, due to the rearward movement of the firing pin 43 independent of the rearward movement of the breech-block 21. This rearward movement of the firing pin 43, is accomplished by virtue of the following mechanism:—slidably mounted in a chamber 59, in the breech-block 21, is a plunger 60, having a head 61 which engages the collar or head 42 of the firing pin 43 in the rear. This plunger 60 is connected with the cam lever 30 by means of a link 62, which is pivotally connected with the said cam lever 30, eccentric of the pivot of the latter, as shown at 63. The opposite extremity of the said link 62 is connected with the plunger 60 by means of a dowel-pin or projection 64, with which the said link is provided, the said dowel-pin being inserted in a slot 4 formed in the plunger 60. Now by virtue of the foregoing connections it may be seen that the rearward movement of the slide-bar 22 acts upon the cam lever 30, which in turn acts upon the firing pin 43, for cocking the fire-arm, or in other words, to place the firing pin 43 under the tension of the spring 44, whereby as soon as the firing pin has been released the spring will act upon the same to fire the fire-arm. It must be noted that the firing pin 43 is slidably mounted upon a pin A which is stationarily secured to the breech-block 21 by means of a pin 3, which passes through the rear extremity of the said pin A and enters the breech-block 21 and that this pin A is provided with a shoulder 72 which forms a stop for one extremity of the spring 44, (see Fig. 9), whereby the said spring may be placed under tension by the rearward movement of the firing pin 43. The rearward movement of the breech-block 21 must have been completed and the block started on its forward movement in order to eject the shell, and the breech-block must have been moved forwardly adjacent the breech of the fire-arm before the firing pin 43 can be released to fire the gun.

Figure 1:
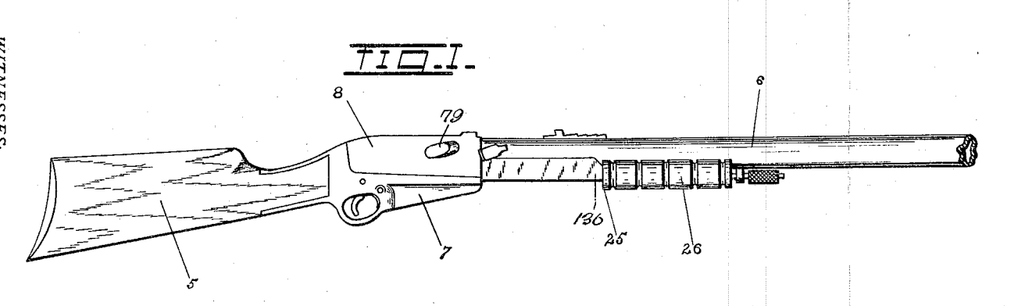
Figure 1 is a side view of my improved fire-arm, showing the same assembled.
Figure 2:
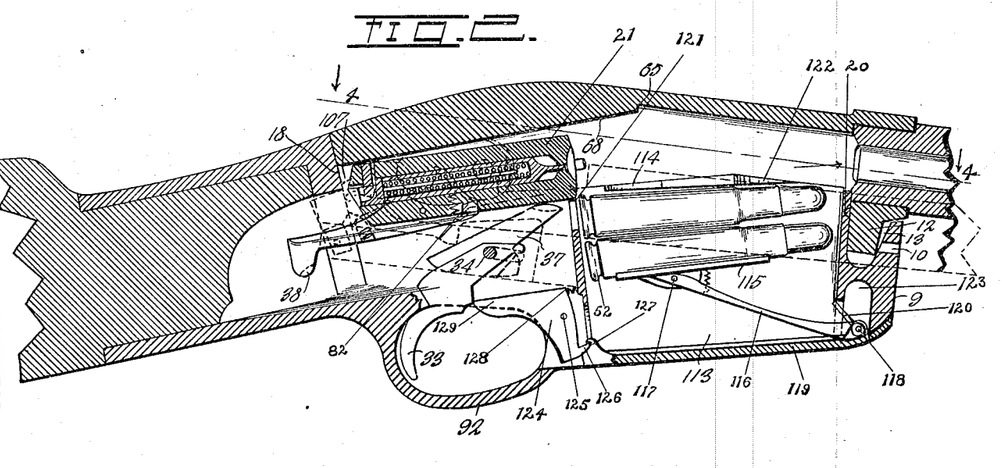
Fig. 2 is a longitudinal section taken on the line 2—2 Fig. 4, looking in the direction of the arrow and showing the operating parts in the open position.
Figure 4:
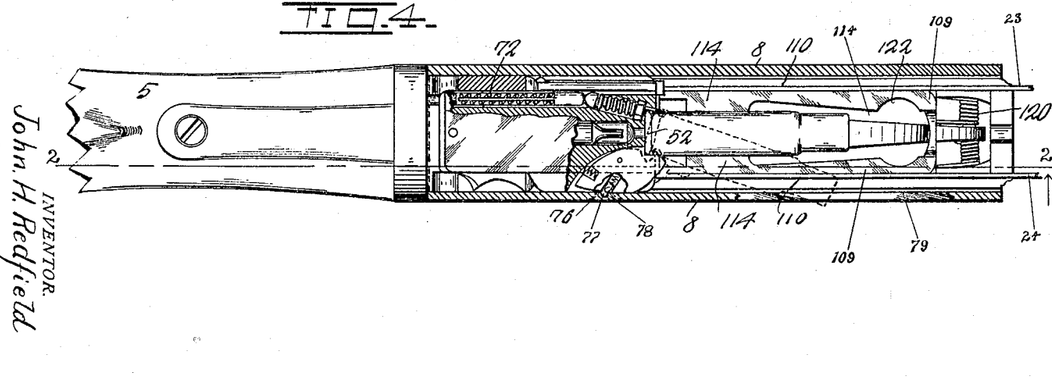
Fig. 4 is a longitudinal section taken on the line 4—4, Fig. 2, looking in the direction of the arrow and showing the operating parts in position to eject a shell.

Attention is here called to the fact that when the breech-block 21 is adjacent the breech of the gun, or in position to fire the latter, as represented in Fig. 3, the cam levers 29 and 30 will occupy depending positions with respect to the breech-block 21 or positions indicated by the dotted lines in Fig. 3, whereby the breech-block 21 is supported in the raised position with the rear extremity of the breech-block 21 in engagement with the breech shoulder 65, by virtue of cam levers 29 and 30 supported by the arms 23 and 24 of the slide-bar 22. When in this position shoulders 66 of the cam levers 29 and 30 are engaged by the fingers 67 of the arms 23 and 24. Now as soon as the slide-bar 22 is started on its rearward movement, the cam levers 29 and 30 turn in the direction of the arrows indicated in Figs. 14 and 10 respectively, whereby the breech-block 21 is permitted to move downwardly out of engagement with the shoulder 65 and the continued movement of the slide-bar 22 results in acting upon the breech-block 21 through the medium of the cam levers 29 and 30, to move the said breech block rearwardly. As soon as the breech-block 21 starts rearwardly it engages the inclined surface 68 of the receiver and as a result tilts the forward extremity of the breech-block upwardly, and when the breech-block 21 has reached its limit of rearward movement the cocking operation will have been completed, by virtue of the mechanism heretofore explained and the shoulder 41, of the sear 39, allowed to engage the collar 42 of the firing pin, whereby the firing pin will be held in position against the tension of the spring 44 until released in the manner which will be later described. Before the breech-block 21 has reached its rearward limit of movement, a pin 69 slidably mounted in a chamber 70 formed in the breech-block 21 will have engaged the shoulder 18 of the receiver and the completion of the rearward movement of the breech-block 21 will result in placing a spring 72 under tension, which acts upon a pin 73 having an enlarged ball-shaped head 74 engaging the head 56 of the ejecting pin 54. But since the rim of the shell is held in a recess 75 in the forward extremity of the breech-block 21, by the tooth 51, of the extractor dog 49, the said shell forms a stop for the ejector pin 54, which in turn holds the pin 73 against movement and causes the spring 72 to be maintained under tension and prevented from acting to eject the shell until after the latter has been released by the tooth 51 of the extractor dog 49. Therefore, when the breech-block 21 has reached its limit of rearward movement, the spring 72 will have been placed under a maximum degree of tension. Now, as soon as the breech-block 21 is moved forwardly, a spring actuated pin 76 will enter a recess 77, formed in a screw 78, inserted in the side of the part 8 of the receiver and the engagement of this pin 76, with the recess 77, will operate to turn the dog 49 upon its pivot 50, against the tension of the spring 53, to release its tooth 51 from engagement with the rim 52 of the shell and as soon as this tooth 51 has been released, the spring 72 will expand and act upon the pin 73, which in turn acts upon the ejector pin 54 to eject the shell through an ejector opening 79 formed in the side of the part 8 of the receiver, (see Figs. 1 and 4). As soon as the pin 76 of the dog 49, has been reelased from the recess 77, the pin will be caused to move into the dog against the tension of its spring and the spring 53 will act upon the dog to cause the latter to assume its normal position.

When the breech-block 21 reaches its forward limit of movement, the cam levers 29 and 30 will be turned in the direction opposite the arrows indicated in Figs. 14 and 10 respectively, and as a result the cam lever 30 will act upon the link 62 to move the plunger 60 against the tension of a spring 80 and when the breech-block 21 has reached its limit of forward movement the reduced extremity 81, of the plunger 60 will have been brought adjacent an opening 82 in the bottom of the breech block 21, whereupon a projection 83, with which the forward extremity of the sear 39 is provided will be permitted to move inwardly against the tension of a spring 84 interposed between the sear and the breech-block, when the projection 38, of the sear is acted upon for firing the fire-arm, whereby the shoulder 41, of the sear 39 will be released from the shoulder or collar 42 with which the firing pin 43 is provided. When the breech-block 21 is moving rearwardly, the plunger 60 will also move rearwardly independently of the breech-block 21, by virtue of the connections hereinafter explained, whereby the reduced extremity 81, of the said plunger will be caused to move out of register with the opening 82 and this opening will be closed by a tubular sear-lock 85, which receives one extremity of the spring 80, and follows after the plunger 60 under the influence of the spring 80. As soon as this sear-lock 85 comes into register with the opening 82, the said opening will be closed against the entrance of the projection 83 of the sear 39 and as a result will prevent the turning of the sear 39 upon its pivot 40, and consequently, the sear 39 will be locked against accidental disengagement of its shoulder 41 from the shoulder or collar 42, of the firing pin 43, thus obviating the possibility of the gun being accidentally discharged. The sear-lock 85 will not totally uncover the opening 82 to permit the entrance of the projection 83 of the sear 39 until the breech-block 21 has reached its limit of forward movement, and occupies the proper position for discharging the fire arm.

Figures 14, 15, 16, 17, 18, 19, 20, 21, 22, 23, 25:
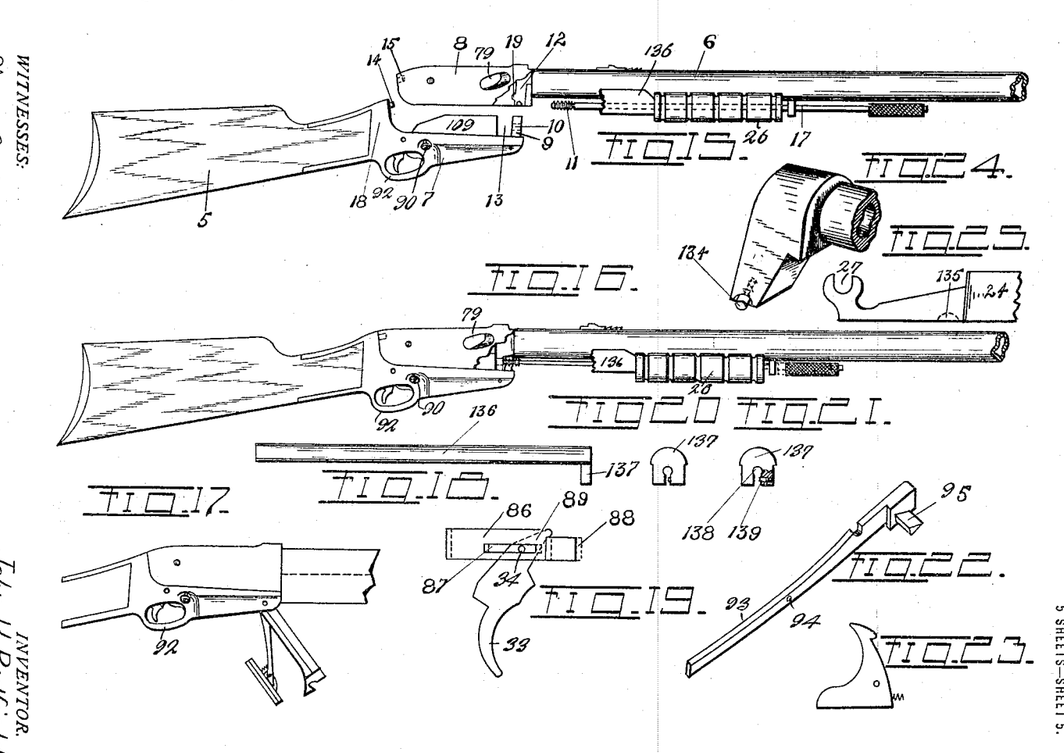
Fig. 15 is a side view of my improved fire-arm illustrating the manner of disconnecting the parts of the same.
Fig. 16 is a side view showing my improved fire-arm in the assembled position.
Fig. 17 is a detailed side view of the receiver illustrating the closure for the cartridge box.
Fig. 18 is a view illustrating the cover for the slide-bar.
Fig. 19 is a detailed view of the safety block.
Fig. 20 is an end view of the cover for the safety block.
Fig. 21 is an end view of the cover for the slide-bar, having a part broken away to illustrate the means for fastening the slide-bar cover in position.
Fig. 22 is a detailed view of the slide-bar lock.
Fig. 23 is a detailed view of a latch for securing the closure for the cartridge box in the closed position.
Fig. 25 is a detailed view of one of the arms of the slide-bar, illustrating the catch notch.

When the breech-block 21 and its parts are in proper relative position for discharging the fire-arm, the parts may be locked against operation for firing the gun by means of a locking member 86 (see Fig. 19) having a slot therein, which receives the pivot pin 34 of the trigger 33, the forward extremity of the said member being provided with a lug 88 extending at right angles thereto and adapted to be passed under an extension 89, with which the trigger 33 is provided. Therefore, when the lug 88 has been moved to a position beneath the extension 89 of the trigger 33, the trigger 33 will be held against turning upon its pivot 34 and as a result the member 37 cannot be actuated for operating the sear 39 to release the firing pin. The locking member 86 is provided with a pin having an operating member 90 which passes through a slot 91 formed in the part 7 of the receiver adjacent the trigger guard 92.

Figure 7:
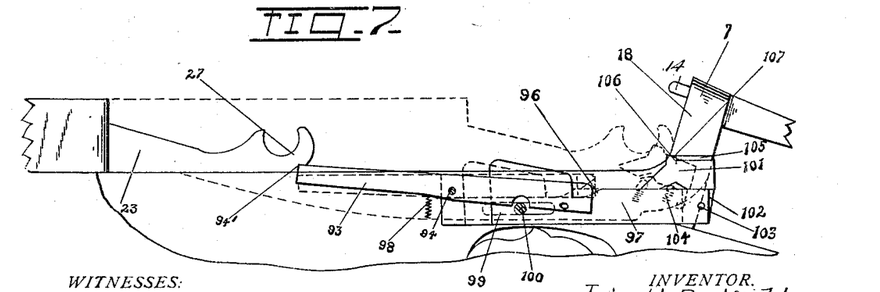
Fig. 7 is a side view of the fire-arm, showing in detail the slide-bar locking lever.
Figure 8:
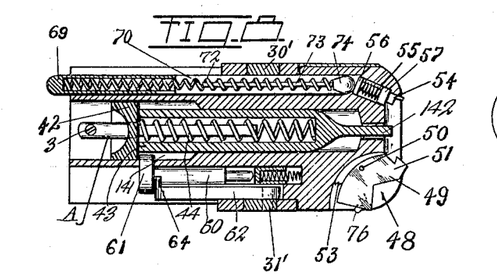
Fig. 8 is a longitudinal section of the breech-block, taken on the line 8—8, Fig. 10, looking in the direction of the arrow and showing the mechanism after the fire-arm has been fired.

I will now proceed to describe the mechanism employed for locking the breech-block 21 in position to fire the gun. On the opposite sides of the part 7, of the receiver, I mount a slide-bar locking device 93, (see Figs. 7 and 22) which consists of a bar arranged parallel or in alinement with the arm 23 of the slide bar 22. This bar or locking device 93 is pivotally mounted on the part 7 of the receiver, as shown at 94, and is provided with a triangular shaped right angular projection 95, which normally occupies a position in a cam-notch 96 formed in an inertia block 97. When this projection 95 is received in the notch 96 of the inertia block 97, the bar 93 is caused to assume the full line position represented in Fig. 7, by virtue of a spring 98, acting upon the said bar 93, whereby the forward extremity of the bar 93 occupies a position directly in the path of the arm 23 and as a result the slide-bar 22 will be prevented from moving rearwardly by virtue of the engagement of its arm 23 with the locking device 93. The bar 23 is provided with a shoulder 94' adapted to be engaged by the forward extremity of the bar or locking devices 93. Now, whenever the fire-arm is discharged, the recoil of the same will act upon the inertia block 97 to slide or jar the latter forwardly, whereby the notch 96, with which the said inertia block is provided is caused to move forwardly beyond the projection 95 of the bar 93 and as the projection 95, of the bar 93, rides out of the notch 96, the said bar 93 is tilted upon its pivot 94 to disengage its forward extremity from the shoulder with which the arm 23 is provided, for leaving the slide-bar 22 free to move rearwardly and carry the breech-block 21 therewith. Attention is here called to the fact that the inertia block 97 is provided with a longitudinal slot 99 through which a pin 100 is passed. The slot 99, of the said inertia block 97 serves to permit the inertia block to slide backwardly and forwardly upon the said pin 100. After the arm 23 of the slide bar 22 has been released in the above described manner, and after the slide-bar 22 has been operated to carry the breech-block 21 rearwardly, the said breech-block will come into engagement with a member 101, having a projection 102 which is pivoted to the rear extremity of the inertia block by means of a pivot pin 103. The further movement of the breech-block 21 will result in sliding the inertia block 97 rearwardly and the pivoted member 101 will engage the shoulder 18 with which the part 7 of the receiver is provided and will be caused to be depressed against the tension of a spring 104, whereby the said member will be received in an opening 105 with which the shoulder 18 is provided and a projection 106 of the said member 101, will engage the wall of the opening 105, as shown at 107, under the influence of the spring 104 acting upon the said member 101. In this manner the inertia block 97 will be caused to move rearwardly until its notch 96 is brought into register with the projection 95 of the bar 93, whereby the said bar will be allowed to turn on its pivot 94 under the influence of its own weight to cause its forward extremity to assume the full line position or the position in the path of the arm 23 of the bar 22 to prevent the latter from being moved rearwardly. Whenever it is desired to release the bar 93 from engagement with the arm 23 for unlocking the fire-arm to permit the breech-block 21 to move rearwardly, the said bar may be tilted out of engagement with the arm 23 by moving a pin 108 upwardly in the slot 109' (see Fig. 5). This pin is secured to the bar 93 and protrudes through the slot 109' in the part 7 of the receiver, adjacent the trigger guard 92.

Attention is here called to the fact that when the slide-bar 22 is moved rearwardly for causing the breech-block 21 to move to the rear position, heels 108 with which the cam levers 29 and 30 are respectively provided are caused to engage the top wall of the part 8 of the receiver and force the breech-block 21 downwardly to release its rear extremity from the shoulder 65, so that the said breech-block may be moved rearwardly.

The breech-block 21 slides between the top wall of the part 8 of the receiver and the top of the part 7 of the receiver, the said breech-block snugly fitting between the two parts to prevent it from moving laterally in any direction.

In the part 7, of the receiver, I arrange parallel spaced partitions or walls 109, a space 110 being left between each of the said partitions or walls and the sides of the part 8 of the receiver for the reception of the arms 23 and 24 of the slide-bar 22.

The partitions or walls 109, also form opposite sides of a cartridge box 113, the top of each partition or wall being provided with an inwardly extending flange 114 which serves to close the top of the cartridge box 113 sufficiently to prevent the lateral removal of a cartridge from the said box. When the breech-block 21 is moved forwardly, the lower edge 121 of its forward extremity engages the rim 52 of a cartridge and moves the cartridge longitudinally to cause the latter to pass through an enlarged opening 122 in the cartridge box and enter the barrel of the fire-arm.

The cartridges in the cartridge box 113 are supported in position so that one will be removed therefrom each time the breech-block 21 is moved from its rear position to its forward position. The cartridges are supported in this position by means of a cartridge shelf 115 upon which the cartridges rest. This shelf is supported by means of an arm 116 pivotally connected at one extremity with the member 115 as shown at 117, while its opposite extremity is pivotally connected as shown at 118. The pivot of this arm serves as the pivot pin or hinge for a closure 119 of the cartridge box 113. The arm 116 is actuated by means of a spring 120 to cause the said arm to move the cartridge shelf 115 upwardly and carry the cartridges therewith, to a position where one of them will be removed from the cartridge box and inserted in the barrel of the fire-arm at each forward movement of the breech-block 21. The forward extremity of the closure 119 for the cartridge box 113 is pivoted upon the pin 118 in an opening 123 and is actuated by means of the spring 120, which has a tendency to throw the closure 119 to the open position, after the same has been released by means of a dog 124 arranged adjacent the trigger guard 92 and pivoted as shown at 125. This dog is provided with a projection 126 adapted to interlock with a hook 127, which is mounted upon the closure 119. The dog 124 is normally held in position to cause its projection 126 to interlock with the hook 127 of the closure 119 by means of a spring 128. By virtue of this construction whenever the part 129 of the dog 124 is pressed upwardly its projection 126 will be caused to be disengaged from the hook 127 and allow the closure 119 of the cartridge box to move to the open position, indicated in Fig. 17, under the influence of the spring 120. The trigger guard 92 serves as a shield or guard for the dog 124 as well as for the trigger 33 and therefore protects the dog 124 against accidental movement.

Attention is here called to the fact that it is impossible to fire my improved fire-arm until the breech-block 21 has been moved to its forward position against the breech of the fire-arm, due to the fact that the lug 38 of the sear 39 is always disengaged from the member 37 when the breech-block 21 is in any position other than its forward position. As heretofore explained the sear 39 is actuated by the trigger 33 through the medium of the member 37 to fire the fire-arm, and consequently when the lug 38 of the sear 39 is disengaged from the member 37, the gun cannot be fired.

When the lug 38 of the sear 39 is in engagement with the member 37, the slide-bar 22 must have been moved forwardly far enough to permit the locking bar 93 to engage the shoulder 94' of the arm 23 and as a result the fire-arm is maintained in the locked position for firing.

Whenever the two parts 7 and 8 of the receiver are disconnected the slide-bar 22 will be held in position by a spring actuated pin 134, which engages a notch 135 formed in the inner side of the arm 24 of the slide-bar 22. This pin 134 is mounted in the lug or projection 12, formed upon the part 8 of the receiver and is held in an inoperative or withdrawn position by means of the part 7 of the receiver, which engages the said pin when the two parts of the receiver are connected and pushes the pin 134 inwardly against the tension of its spring so as to permit the notch 135 in the arm 24 to clear the pin 134 during the movement of the slide-bar 22. This pin 134 is forced outwardly by means of its spring into the notch 135 when the parts 7 and 8 of the receiver are disconnected and as a result holds the slide-bar 22 in position, which in turn supports the breech-block 21 in position in the part 8 of the receiver.

In order to cover up the arms 23 and 24 of the slide-bar 22, between the handle of the latter and the receiver of the fire-arm, I provide a cover 136, which I interpose between the receiver and the handle of the slide-bar 22. This cover 136 fits over the arms 23 and 24 of the slide-bar, with its cap 137 adjacent the receiver of the fire-arm, while the opposite extremity of the cover is adapted to telescope with the handle 26 when the latter is drawn rearwardly for cocking the fire-arm. The forward extremity of the cover 136 protrudes slightly into the handle 26, which forms a support for the forward extremity of the cover, while the opposite extremity of the cover is supported on the rod 17 by means of a spring actuated pin 139, which normally closes the slot 138 against the passage of the rod 17 from the said slot.

In the foregoing description I have passed over mentioning certain specific features in connection with the breech-block and I will now describe these features. The firing pin 43 is mounted in a chamber 140. This chamber is slightly enlarged at its rear extremity as shown at 141 to permit the movement of the enlarged head 42, of the firing pin 43 therein. The forward extremity of the firing pin 43 is provided with a reduced part 142, which passes through an opening 143 in the forward extremity of the breech-block 21. The firing-pin 43 is hollow and within the hollow the spring 44 is arranged. The inner portion of the pin A is inserted through the spirals of the spring, and forms a guide for the spring when the latter is being placed under tension. The pin 3, which holds the rod A in the stationary position, enters the top of the breech-block 21 and the side of the enlarged head 42 of the firing pin 43 is cut away as shown at 144 (see Fig. 10), to permit a maximum degree of rearward movement of the firing pin 43 upon the pin A.

The pin 69 is tubular whereby a maximum length of the spring 72 is obtained and the pin 69 is prevented from being extended its full length beyond the breech-block 21 when the spring 72 is permitted to expand.

Attention is here called to the fact that the cam extremities of the cam levers 29 and 30 are beveled off as shown at 145 to prevent the cam levers from hanging against the walls of the receiver when the said cam levers are turned.

Figure 6:
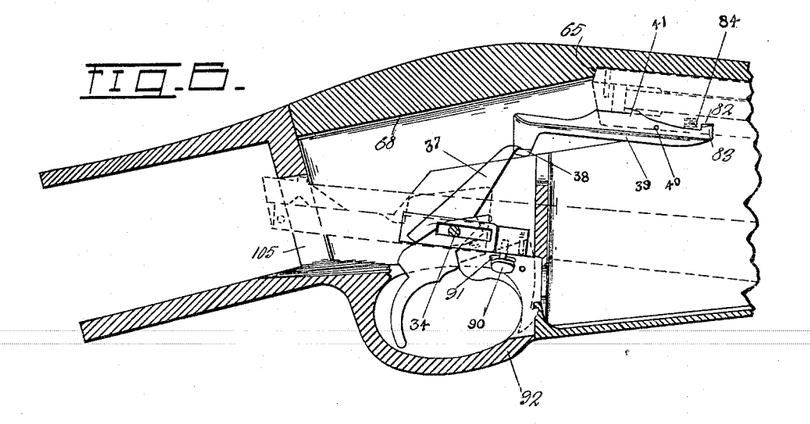
Fig. 6 is a longitudinal section taken on the line 2—2, Fig. 4, looking in the direction of the arrow and showing the operating mechanism in the cocked position.

By referring to Fig. 6, it may be noted that the breech-block 21 normally occupies a position directly on top of the arms 23 and 24 of the slide-bar 22 and that as the slide-bar 22 is moved forwardly the cam levers 29 and 30 furnish a maximum degree of leverage for firmly and rigidly holding the breech-block in its forward position or in the position to fire the gun. These cam arms 29 and 30 furnish or afford a maximum degree of leverage, resulting in forcing the firing pin 43 to the cocked position, against the influence of the spring 44, with great ease.

While I have described and illustrated herein a specific form of my invention, it is understood that the same may be varied and modified without departing from the spirit of my invention and the domain of the appended claims.

Having thus described my invention what I claim is:

1. In a fire-arm, the combination with a breech-block, of a slide-bar for operating the said breech-block, the said slide-bar having separated arms, each of the said arms having a sector-shaped socket formed therein, the breech-block having a cam lever pivoted on each side thereof, the free extremities of said cam levers being circular shaped and adapted to fit in the sector shaped sockets of the slide-bar arms, means acted upon by one of said cam levers for extracting a tight or swollen shell from the fire arm, and means acted upon by the other cam lever for cocking the gun.

2. In a fire-arm, the combination with a breech-block, of means for moving the said breech-block forwardly and rearwardly, comprising a slide-bar, a double cam lever connection between the said slide-bar and the breech-block, means acted upon by one of the said cam levers during the rearward movement of the said slide-bar for assisting in the rearward movement of the breech-block, and means acted upon by the other cam lever during the rearward movement of the slide-bar for cocking the fire-arm.

3. In a fire-arm, the combination with a breech-block, of means for moving the said breech-block to its forward and rearward positions, comprising a slide-bar having separated arms, a cam lever pivoted on each side of the breech-block and respectively connected with the arms of the slide-bar, a pin slidably mounted in the breech-block and acted upon by one of the cam levers, during the rearward movement of the slide-bar, for assisting in the rearward movement of the breech-block, a firing pin mounted in the said breech-block and acted upon indirectly by the other cam lever, during the rearward movement of the slide-bar for placing the firing pin in position to fire the fire-arm, and means also carried by the said breech-block for ejecting the shells from the fire-arm.

4. In a fire-arm, the combination with a breech-block, of means for moving the said breech-block to its forward and rearward positions, comprising a slide-bar having separated arms, each of the said arms having a sector-shaped socket therein, a cam lever pivoted on each side of the breech-block, the free extremities of said cam levers being of circular shape and adapted to fit in the sector shaped sockets of the said side bar arms, the circular shaped extremity of each of said cam levers having a segment taken therefrom, a pin slidably mounted in the breech-block and acted upon by one of the cam levers during the rearward movement of the slide-bar for assisting in the rearward movement of the breech-block, a firing pin also mounted in the said breech-block and acted upon by the other cam lever during the rearward movement of the slide-bar for placing the firing pin in position to fire the fire-arm, and a dog pivoted upon the forward extremity of the breech-block and adapted to engage the shell for extracting the latter from the fire-arm.

5. In a fire-arm, the combination with a breech-block, of means for moving the said breech-block to its forward and rearward positions, comprising a slide-bar having separated arms, cam levers pivoted on each side of the breech-block and respectively connected with the arms of the slide-bar, a pin slidably mounted in the breech-block and acted upon by one of the cam levers when the slide-bar is moved rearwardly, the said pin acting to assist in the rearward movement of the breech-block, a firing pin mounted in the said breech-block and acted upon by the other cam lever when the slide-bar is moved rearwardly, whereby the firing pin is placed in position to fire the fire-arm, a dog mounted upon the forward extremity of the said breech-block and adapted to engage the shell for extracting the latter from the barrel of the fire-arm, and means carried by the said breech-block and acting to eject the shell from the fire arm during the forward movement of the breech-block, substantially as described.

6. In a fire-arm, the combination with a breech-block, of means for moving the said breech-block forwardly and rearwardly, comprising a slide-bar having separated arms, cam levers pivoted to each side of said breech-block and respectively connected with the arms of said slide-bar, means carried by the breech-block and acted upon by one of the cam levers for assisting in extracting a tight shell from the barrel of the fire-arm, and means also acted upon by the said cam levers during the rearward movement of the slide-bar for placing the fire-arm in condition to fire the same.

7. In a fire-arm, the combination of a barrel and breech-block, cam levers mounted upon said breech block, a slide-bar having separated arms connected with said cam levers for moving said breech-block to and from the breech of the barrel, means acted upon by one of said cam levers during the rearward movement of the breech-block for cocking the fire-arm, a sear carried by the breech-block and adapted to be acted upon for firing the gun when the breech-block has reached its forward position, and means acting to release the sear after the breech-block has reached its forward position, substantially as described.

8. In a fire-arm, the combination of a barrel and breech-block, a slide bar for moving said breech-block to and from the breech of the barrel, cam levers mounted upon said breech-block and connected with said driving rod, a firing pin mounted in said breech-block, and acted upon by one of said cam levers during the rearward movement of the drive rod for placing the firing pin in position to fire the gun, a sear carried by the said breech-block and acting upon the said firing pin to retain the latter in position to fire the fire-arm, means for locking the said sear against releasement from the firing pin, and means whereby the said sear is unlocked to permit its release from the firing pin when the breech-block has reached a position adjacent the barrel of the fire-arm, substantially as described.

9. In a fire-arm, the combination of a barrel and a breech-block, a slide-bar for moving said breech-block to and from the breech of the barrel, cam members forming a connection between said breech-block and said slide-bar, one of said cam members being acted upon by the rearward movement of said slide-bar for placing the fire-arm in position to be fired, a sear carried by said breech-block and operable to retain the fire-arm in position to be fired, means for locking the said sear in position to retain the fire-arm in condition to be fired, and means for releasing the sear when the breech-block has reached its forward position.

10. In a fire-arm, the combination of a barrel and breech-block, a slide-bar for moving said breech-block to and from the breech of the barrel, firing mechanism mounted upon the said breech-block, a cam lever mounted upon said breech-block in operative relation with said slide bar, and operable by the rearward movement of the slide-bar for placing the said mechanism in position to fire the fire-arm, a sear for retaining the firing mechanism in position to fire, means for locking the sear in the retaining position, and means for unlocking the said sear so that the latter may be released from the retaining position when the breech-block has reached its forward position, substantially as described.

11. In a fire-arm, the combination with a breech-block, of means for moving the said breech-block forwardly and rearwardly, comprising a slide-bar, a cam lever mounted upon the breech-block and acted upon by the slide-bar during the rearward movement of the latter for cocking the fire-arm, a sear carried by the breech-block and operable to retain the fire-arm in position to be fired, means operable during the rearward movement of the breech-block for locking the sear against movement and operable during the forward movement of the breech-block for unlocking the said sear after the breech-block has reached its forward limit of movement, and means adapted to act upon the sear for releasing the latter to fire the fire-arm, substantially as described.

12. In a fire-arm, the combination of a barrel and a breech-block, a slide-bar for moving said breech-block to and from the breech of the barrel, firing mechanism movable with said breech-block, a cam lever mounted upon said breech-block, and operable by the rearward movement of the slide-bar for placing the said mechanism in position to fire the gun after the breech-block has been moved to its forward position, a latch member automatically operable for retaining the said breech-block in its forward position, a sear pivoted upon the said breech-block, means operable by the rearward movement of the breech-block for locking the sear in the retaining position and operable by the forward movement of the breech-block for unlocking the said sear after the breech block has reached its forward position, whereby the sear may be released from its retaining position, and means adapted to act upon the sear for releasing the latter from its retaining position to fire the fire-arm.

13. A fire-arm, comprising a barrel and breech-block, a bar operable for moving said breech-block to and from the breech of the barrel, firing mechanism carried by the said breech-block, a cam lever mounted upon said breech-block and operable by said bar for placing the said mechanism in position to fire the fire-arm, a sear pivoted upon the said breech-block and automatically operable for retaining the firing mechanism in position to fire the fire-arm, means operable by the rearward movement of the breech-block for locking the sear in the retaining position, said means being operable by the forward movement of the breech-block for unlocking the said sear so that the latter may be released from the retaining position when the breech-block has reached its forward position, a trigger, and a member interposed between the trigger and the sear, said member being operable by the trigger for releasing the sear from the retaining position to fire the fire-arm, substantially as described.

14. In a fire-arm, the combination of a barrel and breech-block, a slide bar for moving said breech-block to and from the breech of the barrel, firing mechanism carried by the said breech-block, a cam lever mounted upon said breech-block and operable by the rearward movement of the slide-bar for placing the said mechanism in position to fire the fire-arm, a sear for retaining the firing mechanism in position to fire, a trigger and a member interposed between the said trigger and the sear, said member engaging the sear and operable by the trigger for releasing the said sear from the retaining position for firing the fire-arm, said sear being disengaged from said member when the breech-block is in any position except its forward position, substantially as described.

15. In a fire-arm, the combination of a barrel and breech-block, means for moving said breech-block to and from the breech of the barrel, firing mechanism carried by the said breech-block, a cam lever mounted upon said breech-block and operable during the rearward movement of the breech-block for placing the said mechanism in position to fire the fire-arm, a sear carried by the breech-block and adapted to engage the firing mechanism for retaining the latter in position to fire the fire-arm, and means engageable with the said sear after the breech-block has reached its forward limit of movement, said means being adapted to act upon the sear for disengaging the latter from the firing mechanism to fire the fire-arm.

16. In a fire-arm, the combination with a receiver and a barrel, of a breech-block movable in the said receiver, a slide bar for moving said breech-block to and from the breech of the barrel, a spring actuated firing pin mounted in the said breech-block, a cam lever mounted upon said breech-block and operable by the rearward movement of the slide bar for placing the said pin under tension of its spring, a sear for retaining the firing pin in position against the tension of its spring, a trigger, and a member interposed between the said trigger and the sear, said member engageable with the sear when the breech-block has reached its forward position and operable by the trigger for releasing the said sear from the retaining position for firing the fire-arm.

17. In a fire-arm, the combination with a barrel and a receiver, of a breech-block movable in the said receiver to and from the breech of the barrel, a spring actuated firing pin carried by the said breech-block, a cam lever connected in operative relation with the said firing pin and operable by the rearward movement of the breech-block for placing the firing pin under tension of its spring, a firing member mounted upon said breech block, a sear pivotally mounted upon the said breech-block and having a shoulder adapted to engage the firing member after the breech-block has reached its forward limit of movement against the breech of the barrel, and means adapted to act upon the said member for releasing the sear from engagement with the firing pin to permit the latter to move forwardly under the influence of its spring for firing the fire-arm.

18. In a fire-arm, the combination with a barrel and a receiver, of a breech-block, a slide-bar for moving said breech-block to and from the breech of the barrel, cam levers pivotally mounted upon the breech-block and connected in operative relation with the slide-bar, a spring actuated firing pin mounted in the breech-block, a plunger also mounted in the breech-block and engageable with the firing pin, one of the said cam levers acting upon the said plunger during the rearward movement of the slide-bar, for placing the firing pin under tension of its spring, means acted upon by the other cam lever during the rearward movement of the slide-bar for assisting in extracting a tight or swollen shell from the barrel of the fire-arm, a sear having a shoulder adapted to engage the firing pin after the latter has been placed under tension of its spring, and means engageable with the sear after the breech-block has reached its forward limit of movement and operable to disengage the shoulder of the sear from the firing pin to permit the latter to plunge forwardly under the influence of its spring for firing the fire-arm.

19. In a fire-arm, the combination with a receiver and a barrel, of a breech-block movable in the said receiver, a slide-bar for moving said breech-block to and from the breech of the barrel, a spring actuated firing pin mounted in the said breech-block, a cam lever pivotally mounted upon the said breech-block and connected in operative relation with the slide-bar, a plunger engaging the firing pin and acted upon by the said cam lever during the rearward movement of the slide-bar for placing the said pin under tension of its said spring, a sear for retaining the firing pin in position against the tension of its spring, a sear lock member operable when the breech-block is moved rearwardly for locking the sear in engagement with the firing pin, said locking member being operable by the plunger on the forward movement of the breech-block for unlocking the said sear, and means engageable with the sear when the breech-block has reached its forward limit of movement and operable for releasing the said sear from engagement with the firing pin to permit the latter to plunge forwardly under the influence of its spring for firing the fire-arm.

20. In a fire-arm, the combination with a receiver and a barrel, of a breech-block movable in the said receiver, a slide-bar for moving said breech-block to and from the breech of the barrel, an extractor dog pivotally mounted upon the breech block and adapted to engage a shell for extracting the latter from the barrel of the fire-arm during the rearward movement of the breech-block, a spring actuated pin mounted in said extractor dog, means engageable with said pin for releasing the said dog from the shell after the breech-block has been started on its forward movement, a spring actuated ejector engaging the shell and acting to eject the latter from the fire-arm after having been released by the ejector dog.

21. In a fire-arm, the combination with a barrel and a receiver, of an extractor movable in the said receiver to and from the breech of the barrel, said extractor engaging the shell for extracting the latter from the barrel of the fire-arm during the movement of the extractor from the breech of the barrel, a spring actuated pin mounted on said extractor, means engageable with said pin on the movement of the extractor to the breech of the barrel for releasing the shell, a spring actuated ejector acting upon the said shell after having been released by the extractor for ejecting the same from the fire-arm, substantially as described.

22. In a fire-arm, the combination with a receiver and a barrel, of a breech-block movable in the said receiver to and from the breech of the barrel, an extractor carried by said breech-block, the said extractor consisting of a spring actuated pivoted dog adapted to engage the shell and extract the same from the breech of the fire-arm during the rearward movement of the said extractor, said pivoted dog having a spring actuated pin carried thereby and the wall of the receiver having an opening in the path of the said spring actuated pin, said opening being engageable by the spring actuated pin during the forward movement of the extractor for releasing the said pivoted dog from the shell, and means for ejecting the shell from the fire-arm, substantially as described.

23. In a fire-arm, the combination with a receiver and the barrel thereof, of a breech-block movable in the receiver, an extractor carried thereby, said extractor consisting of a pivotally mounted member and a spring actuated pin carried by the pivotally mounted member and engageable with the receiver for operating the said pivotally mounted member to release the latter from the shell, substantially as described.

24. In a fire-arm, the combination with a receiver and a barrel, of a breech-block movable in the said receiver to and from the breech of the barrel, means carried by the breech-block and engaging the shell for extracting the latter from the barrel of the fire-arm during the rearward movement of the breech-block, a pin carried by said means and engageable with the receiver for releasing said shell, a spring actuated pin mounted in the breech-block and engageable with the rear of the receiver for ejecting the shell from the fire-arm, substantially as described.

25. In a fire-arm, the combination with the receiver and the barrel thereof, of a breech-block movable in the said receiver, means carried by the breech-block for extracting a shell from the barrel of the fire-arm, an ejector pin mounted in the breech-block and adapted to engage the shell, and a second pin also mounted in the breech-block and engageable with the rear end of the receiver when the breech-block has been moved to the rear position, the first named pin being arranged at an angle to the second named pin, the said second pin adapted to act upon the first named pin for ejecting the shell from the fire-arm, substantially as described.

130

26. In a fire-arm, the combination with a receiver and a barrel of a breech-block movable in the said receiver to and from the breech of the barrel, means carried by the breech-block for ejecting a shell from the barrel of the fire-arm during the rearward movement of the said breech-block comprising an ejector-pin mounted in the breech-block at an angle to the length of the latter, said ejector pin being adapted to engage the shell, and a second pin arranged in the breech-block longitudinally thereof and engaging the first named pin, the last named pin being adapted to engage the rear of the receiver when the breech-block is moved rearwardly and act upon the first named pin for discharging the shell from the receiver as the breech-block is moved forwardly.

27. In a fire-arm, the combination with a receiver and a barrel, of a breech-block movable in the said receiver, means carried by the said breech-block for extracting a shell from the barrel of the fire-arm, a spring actuated ejector pin arranged in the breech-block at an angle to the length of the latter, said pin being normally held in a retracted position, a second spring actuated pin arranged longitudinally of the breech-block and engageable with the rear end of the receiver for placing the said spring of the said pin under tension, whereby when the shell has been released by the extractor, the first named pin will act upon the shell to eject the latter from the fire-arm, substantially as described.

28. In a fire-arm, the combination with a receiver and a barrel, of a breech-block movable in the said receiver to and from the breech of the barrel, means for locking the breech block in position adjacent the breech of the barrel, comprising a latch member pivotally mounted in the receiver and engageable with the slide-bar for preventing rearward movement of the latter, and an inertia block mounted in the receiver and acted upon by the recoil of the fire-arm for disengaging the said latch from the slide-bar to permit the breech-block to be moved rearwardly, a spring actuated dog mounted upon said inertia block, said breech-block engageable with the said dog on the rearward movement of the breech-block, whereby the said inertia block is moved rearwardly for placing the latch in an operative position, and means engaged by said dog for holding said inertia block in its rear position, substantially as described.

29. In a fire-arm, the combination with a receiver and a barrel, of a breech-block movable in the said receiver, a slide-bar for moving said breech-block to and from the breech of the barrel, means for locking the breech-block in position adjacent the breech of the barrel, comprising a pivotally mounted latch engageable with the slide-bar for preventing the rearward movement of the latter, and an inertia block acted upon by the recoil of the fire-arm for disengaging the latch from the slide-bar, said inertia block having a spring actuated dog pivoted thereto, said dog being engageable by the breech-block on the rearward movement of the latter, and the receiver having an opening into which the said dog is forced by the rearward movement of the breech-block, said dog engaging the wall of the opening under the influence of its spring and the inertia block acting upon the latch for holding the same in an operative position, substantially as described.

30. In a fire-arm, the combination with a stock and barrel thereof, of a receiver interposed between the stock and barrel, the said receiver consisting of two integral forward parts, one of the said parts being connected with the stock while the other part is connected with the barrel, the part of the receiver connected with the stock having a dowel-pin mounted thereon, the part of the receiver connected with the barrel having an opening in its rear extremity adapted to receive the said dowel-pin, the forward extremity of the part of the receiver connected with the stock having a recess therein, the forward extremity of the receiver connected with the barrel having a lug adapted to enter the said recess, and a rod engageable with the said lug, for securing the two parts of the receiver in their connected relation, substantially as described.

31. In a fire-arm, the combination with a stock and barrel thereof, of a receiver interposed between the stock and barrel and consisting of two parts, one of which is connected with the stock while the other is connected with the barrel, the part of the receiver connected with the stock having a shoulder arranged laterally to the length of the fire-arm, the said shoulder having a dowel-pin formed thereon, the forward extremity of the part of the receiver connected with the stock having a recess therein, the rear extremity of the part of the receiver connected with the barrel having a recess therein adapted to receive the dowel-pin, and the forward extremity of the said part having a depending projection adapted to enter the recess in the part of the receiver connected with the stock, the forward portion of the part of the receiver connected with the stock having a perforation therein communicating with the recess, and a rod adapted to be threaded into the said perforation and engage the lug of the part of the receiver connected with the barrel for securing the two parts of the receiver in their connected relation.

32. In a fire-arm, the combination with a receiver and a barrel, of firing mechanism mounted in the receiver, and a slide-bar having arms extending into the receiver and connected in operative relation with the firing mechanism for operating the latter, a handle connected with the outer extremity of the said slide-bar, and a cover for the slide-bar interposed between the receiver and the handle of the slide-bar, substantially as described.

33. In a fire-arm, the combination with a receiver and a barrel, of firing mechanism mounted in the receiver, a slide-bar movable longitudinally of the barrel and having arms extending into the receiver, the said arms being connected with the firing mechanism for operating the latter, a handle with which the said slide-bar is provided, a guide rod for the said slide-bar, and a cover for the said slide-bar interposed between the receiver and the handle of the slide-bar, one extremity of the said cover being secured to the guide rod while the other extremity of the said cover telescopes with the handle of the slide-bar, the said handle being hollow to receive the said cover, substantially as described.

In testimony whereof I affix my signature in the presence of two witnesses.

JOHN H. REDFIELD.

Witnesses:
 WILLIAM E. WINDSOR,
 OLGA BERLEY.

Copies of this patent may be obtained for five cents each, by addressing the "Commissioner of Patents, Washington, D. C."